Aug. 16, 1955  D. HARTMAN ET AL  2,715,335
NAVIGATION SYSTEM FOR AIRCRAFT
Filed May 15, 1951  5 Sheets-Sheet 1

FIG 1

INVENTORS
DAG HARTMAN
ERIK BRATT

BY
ATTORNEYS

FIG. 2

United States Patent Office 2,715,335
Patented Aug. 16, 1955

2,715,335

NAVIGATION SYSTEM FOR AIRCRAFT

Dag Hartman and Erik Bratt, Linkoping, Sweden, assignors to Svenska Aeroplan Aktiebolaget, Linkoping, Sweden, a joint-stock company Application May 15, 1951, Serial No. 226,518

Claims priority, application Sweden May 17, 1950

16 Claims. (Cl. 73—178)

The present invention relates to a navigation system and more particularly to a navigation system employing a cathode ray oscillograph.

A modern high speed aircraft with a short action time has to be provided with an instrumentation that is easy to read and wherein the number of units included must be as small as possible. Available means of assistance used nowadays for navigating an aircraft in bad weather is not only complicated to use in itself but the manner in which the navigational data are presented are so complicated that they usually require all the attention of the pilot for carrying out an unfailing navigation. Furthermore the presentation of a position is such that the pilot is unable to orientate himself without on one hand simultaneously following the map that he usually keeps on his knees, and on the other hand performing a great number of mental calculations.

The principal object of this invention is to eliminate the above mentioned difficulties by providing an improved navigation system of the above described character, wherein the cathode ray oscillograph is combined with calculating means operatively connected to a number of primary gauges in the aircraft, so that necessary navigational data are presented in one presentation on the cathode ray tube screen.

Another object is to provide a navigation system of the above described character with fuel and altitude responsive means enabling the pilot to get information about the remaining flying range of the aircraft, whereby said means measure the remaining fuel quantity in the fuel tanks and the altitude of the aircraft and from these measures calculates the remaining flying range and presents it in the above mentioned presentation.

A further object of the invention is to provide in a navigation system as above described such means that the pilot with a relatively good accuracy can determine his position without the necessity of having contact with ground or ground positioned radio or other beacons, and that he can determine whether his position is within the remaining flying range of the aircraft or not.

A still further object is to provide means for writing up a track on a map or the like located in front of the screen of the cathode ray oscillograph or made visible on this screen, this track including the route the pilot has to fly in order to reach a certain destination whereby he can determine if the straight path is the best one or not.

Still another object is to provide means so that the pilot in the above mentioned presentation can determine the exact numerical value of his course.

A more specific object of the invention is to provide means, whereby the position of other aircraft relatively to the one aircraft close to the one aircraft can be made visual to the pilot in the above mentioned presentation and that he can determine the distance and the destination to these other aircraft.

The invention will now be described with reference to the accompanying drawings, wherein.

Figure 1:
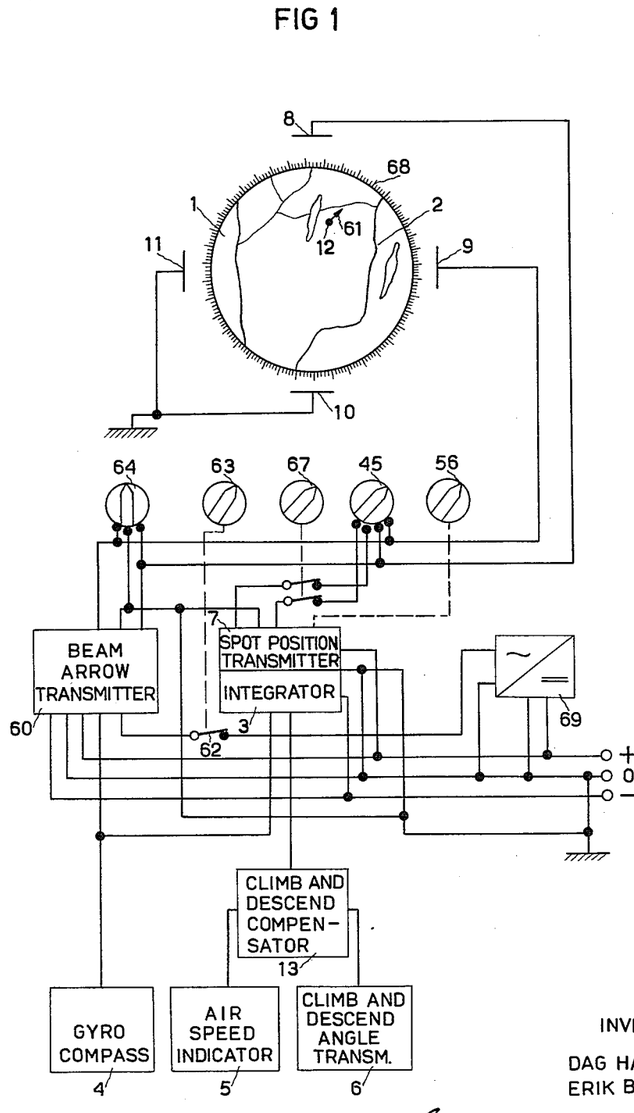
Fig. 1 is a diagrammatic view of the navigation system showing an arrangement for positioning a spot image on the screen of the tube in a position corresponding to the position coordinates of the aircraft and for extending a line shaped arrow from the spot image in a direction corresponding to the course of the aircraft.

With reference to Fig. 1 of the drawings the navigation system includes a large-screened cathode ray tube 1 (a smaller cathode ray tube with an optical projection system is also suitable for use) which is mounted in the aircraft at a location fully visible to the pilot. In front of the screen of the tube there is located a transparent map 2 which is cut out so as to cover the cathode ray tube entirely, and the scale of the map is so chosen, that the flying range of the aircraft falls within the region covered by the map.

In the embodiment shown a calculating device 3, hereinafter called integrator, is actuated by the gyro compass 4 and the air speed indicator 5 of the aircraft. The information received from the gyro compass 4 is mixed in the integrator 3 with time integrated information received from the air speed indicator 5—true air speed— so that the resultant outputs in the integrator will be proportional to the changes of the position coordinates of the aircraft. The magnitude of the deviation of the air speed indicator has of course to be corrected in dependence on whether the aircraft flies in level flight or whether the aircraft climbs or descends, i. e. the horizontal component of the speed vector, and for this purpose there are arranged a climb and descend angle transmitter 6, comprising an angular sensitive device, e. g. a gyro, delivering the climb and descend angle, and a compensating device 13, called climb and descend compensator, for compensating the deviation of the air speed indicator with respect to the cosine of the climb and descend angle, when the aircraft is climbing or descending. The outputs of the integrator are fed into a device 7, hereinafter called beam spot position transmitter, which is connected to the deflection means 8, 9, 10, 11 of the cathode ray tube 1 for producing a spot image 12 on the screen of the tube in a position to indicate the position coordinates of the aircraft.

Figure 2:
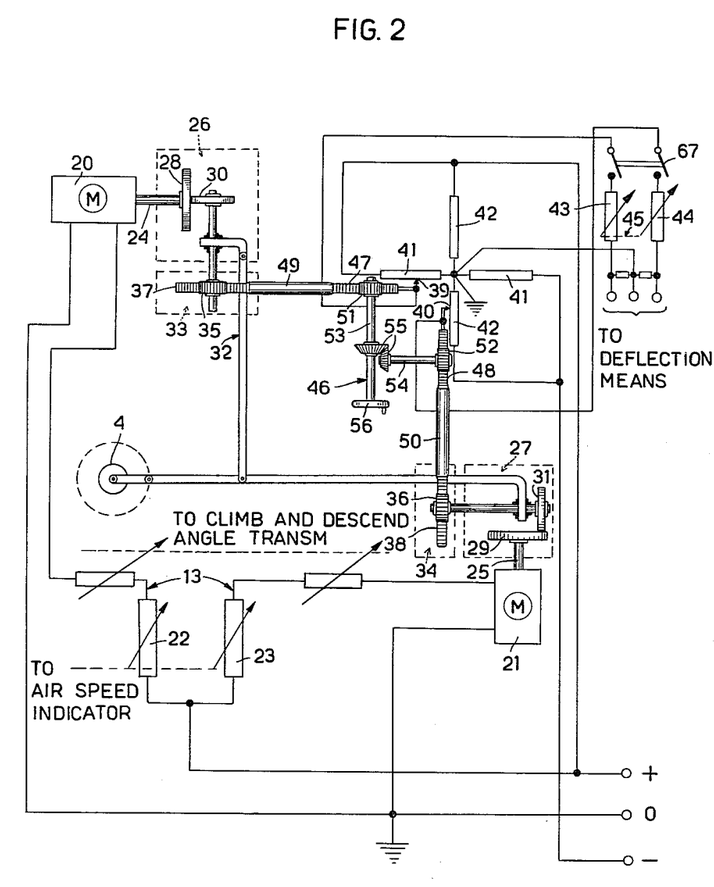
Fig. 2 is a view of the device by means of which the spot image is positioned on the screen.

The beam spot position transmitter 7 and the time integrator 3 of the instrument may be built up according to Fig. 2. Here direct current motors 20 and 21 are utilized, the rotation speed of which are dependent on the air speed indicator by means of two rheostats 22 and 23. The rheostats 22 and 23 are so arranged that when the speed of the aircraft is zero the rheostats are in neutral position, which corresponds to no rotational speeds of the motors. When the aircraft changes its speed from zero to maximum the rheostats follow the change and influence the motors so that their rotational speeds change linearly in proportion to the speed change of the aircraft. The output shaft 24 and 25 respectively of each motor 20, 21 is connected to a continuous gearing transmission 26 and 27 respectively, each of which including a larger disc 28, 29 which is rigidly fixed on motor shafts 24, 25 and a smaller disc 30, 31 rotatably mounted on a linkage 32 at right angles to the larger disc 28, 29, so that the periphery of the smaller disc 30, 31 frictionally engages with one side surface of the larger disc. The smaller discs 30, 31 are radially displaceable on the side surface of the respectively larger discs 28, 29 and arranged to be displaced by the gyro compass 4 through the linkage 32 in such a way that the displaceable disc 30 and 31 respectively of each transmission with respect to speed and direction of rotation depends on the deviation of the directional gyro. Thus the gyro compass 4 is through the linkage 32 so connected to the discs 30, 31 that the rotation speed of the one disc is zero, when the other disc runs at full speed and vice versa, and that the disc can change its direction of rotation, when the displaceable disc passes the centre of the non-displaceable disc. In operation when the aircraft is flying e. g. in a straight northerly direction the disc 31 is at the periphery of the disc 29 and the disc 30 is in the centre of the disc 28. In changing the course of the aircraft from e. g. a northerly to an easterly heading the disc 31 is moved by the gyro compass towards the centre of the disc 29 and the disc 30 is moved towards the periphery of the disc 28. If then the aircraft changes its direction of flight e. g. towards a southerly course the disc 31 is moved by the gyro compass through the centre of the disc 29 to the opposite side of the periphery of this disc, while the disc 30 is moved towards the centre of the disc 28. The output shaft of each transmission is connected by another gear transmission 33 and 34, comprising a pinion 35, 36, which is axially movably mounted on the output shaft and meshes with a rack 37, 38 for transmitting a rotary motion into a linear motion, to each of two sliding contacts 39 and 40 on potentiometers 41 and 42 respectively, and the sliding contacts of the potentiometers are electrically connected through another set of potentiometers 43, 44, whose function is to compensate the output from the spot position transmitter 7 with respect to wind velocity and direction, to the deflection means of the cathode ray oscillograph. Thus the voltages delivered from the spot position transmitter 7 to the deflection means determine the position of the beam spot on the oscillograph screen. The wind correction potentiometers 43, 44 are adapted to be manually set by a control knob 45 as shown in Fig. 1.

The beam spot 12 is arranged to be manually displaced by a correcting means 46 comprising two racks 47, 48, which extend in alignment with and slidably and frictionally engage each of two output shafts 49, 50 of the transmissions 33 and 34, and two pinions 51, 52 intermeshing with the racks 47, 48 and coupled by means of two shafts 53, 54 and a bevelled drive 55 between the shafts to a control knob 56, by means of which the setting of the sliding contacts 39, 40 of the potentiometers 41, 42 can be adjusted to correct the position of the beam spot 12 in relation to the map 2. This is necessary because the pilot must be able to orientate the spot correctly relatively to the starting point (home base) of the aircraft, and also to correct the position of the spot, when fixed points on the ground are sighted.

To enable the pilot to determine the course of the aircraft at a certain moment the beam spot can be extended by means of a device 60, hereinafter called beam arrow transmitter to a line shaped short arrow 61 pointing in a direction which indicates the flying course of the aircraft. The beam arrow transmitter is switched on and off by a switch 62 controlled by a knob 63, and a second knob 64 is arranged to actuate the transmitter to further extend the beam arrow 61. The second knob 64 operates two potentiometers 65 and 66 so connected that the amplitudes of the two output voltages from the beam arrow transmitter 60 can simultaneously be regulated. By extending the beam arrow 61 the point of the arrow can be made to point directly at a certain point of destination, whereby the pilot by looking at the screen can see the "track" he has to fly to get the shortest way to this destination.

By means of another knob 67 the extended beam arrow can be moved in parallel, so that the base of the arrow moves to the centre of the cathode ray tube, whereby the point of the arrow points at a particular scale line of a graduated scale 68 attached around the periphery of the cathode ray tube. This is achieved in that the output voltage from the beam position transmitter is disconnected from the deflection means of the cathode ray tube. If the scale is properly oriented in relation to the cardinal points of the map, the pilot is evidently able to read at the point of the arrow which course the aircraft keeps at the moment of reading.

Figure 3:
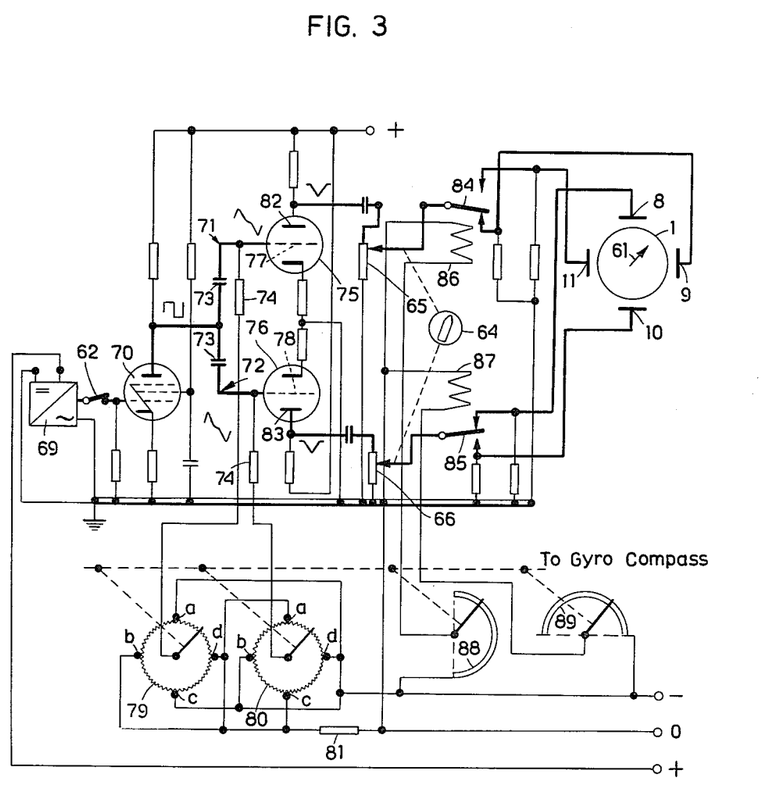
Fig. 3 is a view of the device by means of which the line shaped arrow is extended from the spot image.

The beam arrow transmitter 60 of the instrument may be built up by an electronic device according to Fig. 3. The alternating voltage generated by an inverter 69 is fed into an electron tube 70, wherein a square wave voltage is generated. In differentiating devices 71 and 72, each of which comprising a capacitor 73 and a resistor 74, two voltages of peaked short pulses are generated, which are fed into electron tubes 75 and 76. The two grids 77 and 78 of the two electron tubes 75 and 76 are electrically connected to the sliding contacts of two ring potentiometers 79 and 80, the resistance ring of which has four connection points $a$, $b$, $c$ and $d$ displaced 90° apart with respect to each other. The two opposite connection points of each potentiometer are interconnected. The points $a$ and $c$ of the potentiometer 79 are connected to a negative D. C. voltage and the points $b$ and $d$ of the potentiometer 79 are connected to "earth" through a bias resistor 81. The points $a$ and $c$ of the potentiometer 80 are connected to "earth" through the bias resistor 81 and the points $b$ and $d$ of the potentiometer 80 are connected to the negative voltage.

The bias resistor 81 gives the two grids of the tubes 75 and 76 a fixed negative voltage and this resistor is so chosen that the fixed negative voltage gets such a magnitude that the two tubes at rest are in cut off independent of the position of the sliding contacts of the potentiometers 79 and 80. The sliding contacts of the potentiometers are mechanically connected to the directional gyro 4 and this connection is so arranged that the sliding contacts follow the deviation of the gyro due to course deviation of the aircraft, synchronously.

If the aircraft is flying e. g. on a northerly heading the position of the sliding contact of the potentiometer 79 will be just at the connection point $a$ of this potentiometer and the position of the sliding contact of the potentiometer 80 will be just at the connection point $a$ of this latter potentiometer. The grid of the tube 75 gets the whole negative bias available, but the grid of the tube 76 gets only that negative bias voltage which is imposed upon the resistor 81. The tube 75 is then so effectively biased beyond cut off that no part of the peaked short pulses generated in the tube 70 can pass through, but the tube 76 has then such a bias that it will let through the whole positive part of said peaked short pulses. If the aircraft changes its heading e. g. towards an easterly course then through the sliding contacts of the potentiometer 79 the negative bias on the grid of the tube 75 becomes less negative while the negative bias on the grid of the tube 76 becomes more negative. The positive part of the peaked pulses previously mentioned can pass more and more through the tube 75 but less and less through the tube 76. For northerly and southerly headings the positive parts of the peaked pulses can to their whole magnitude get through the tube 76 but can not get through the tube 75, for easterly and westerly headings the positive pulses get through the tube 75 but not through the tube 76 and for headings between these four headings the biases on the grids of the tubes will be of such magnitudes that to the headings proportional parts of the positive parts of the peaked pulses are let through. The anodes 82 and 83 of the two electron tubes 75 and 76 are electrically connected via the potentiometers 65 and 66 and tongues 84 and 85 of two relays 86 and 87 to the deflection means 8, 9, 10, 11 of the cathode ray oscillograph. The two relays 86 and 87 are operated by two switches 88 and 89, each of which comprises a semicircular contact sector, which is rotated 90° with respect to the other sector, and a sliding contact, which is mechanically coupled to the directional gyro. The switches are controlled by the gyro in the following way. When the aircraft is flying in headings included of the sector west-north-east and switch 89 is closed and when the aircraft is flying in headings included of the sector east-south-west the switch 89 is open. In flying in the sector south-west-north the switch 88 is open and in flying in the sector north-east-south the switch 88 is closed. Thus the switches control through the relays 86 and 87 the feed of the voltage pulses to the deflection means of the cathode ray tube from the anodes 82 and 83 so that for westerly-northerly headings the anode 82 is in contact with the deflection means 11 of the cathode ray tube and anode 83 is in contact with the deflection means 8 of the cathode ray tube. For northerly-easterly headings the anode 82 is in contact with the deflection means 9 of the cathode ray tube and the anode 83 is in contact with the deflection means 8 of the cathode ray tube etc.

Figure 4:
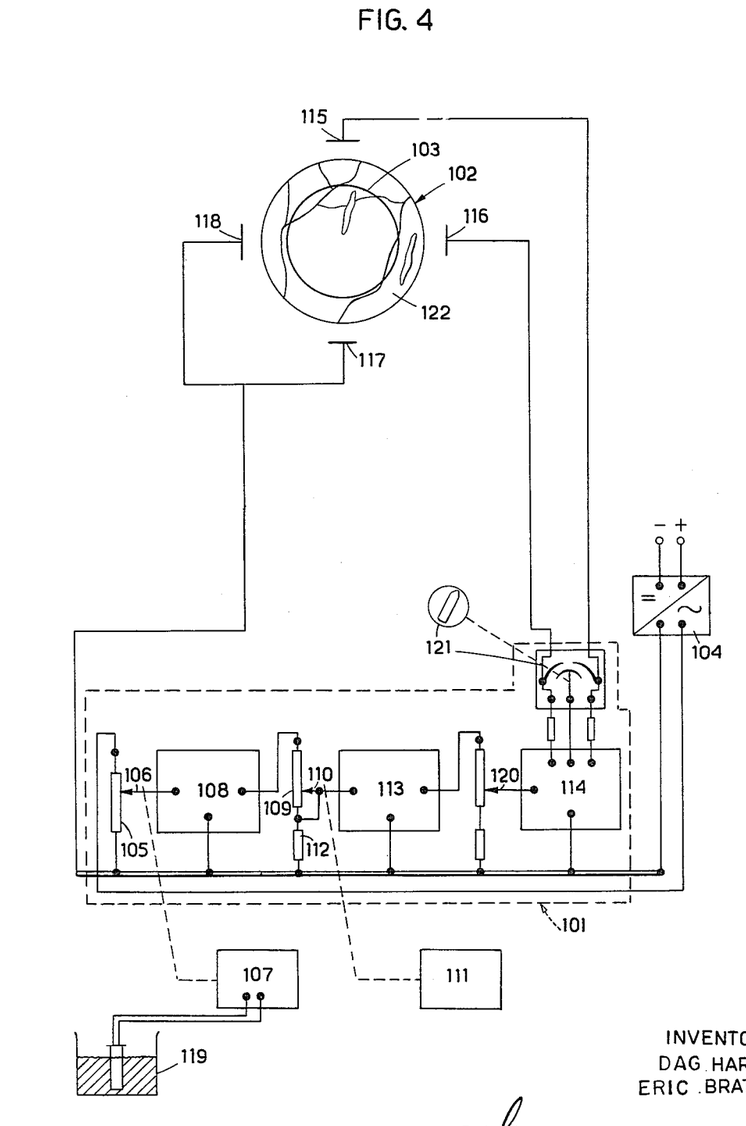
Fig. 4 is a diagrammatic view showing an arrangement for positioning on the screen of the tube a ring shaped display the radius of which indicates the remaining flying range of the aircraft.

The arrangement shown in Fig. 4, includes a calculating device 101, called a beam ring transmitter, whose function is to produce on the screen of the cathode ray tube 102 a ring shaped display 103, the radius of which indicates the remaining flying range of the aircraft. The beam ring transmitter is an electronic device, which is connected to an inverter 104, generating A. C. voltage, and which includes a voltage divider 105, e. g. a potentiometer, into which the A. C. voltage from the inverter 104 is fed. The sliding contact 106 of the potentiometer 105 is regulated by the fuel gauge 107 of the aircraft, so that the position of the contact varies in dependence of the position of the fuel gauge, and the contact is electrically connected through an impedance match 108 to another potentiometer 109, the sliding contact 110 of which is controlled by the altimeter 111 of the aircraft for positioning the contact 110 in dependence of the position of the altimeter. In series connection with the potentiometer there is arranged a small resistor 112 which is electrically connected to an amplifier 113. The output voltage of the amplifier 113 is fed through a phase shifter 114 to the deflection means 115, 116, 117 and 118 of the cathode ray tube 102.

The sliding contact 106 of the potentiometer 105 is so regulated by the fuel gauge 107 that when the fuel tanks 119 of the aircraft are full all the A. C. voltage delivered by the inverter 104 to the potentiometer 105 is fed into the impedance match 108 and when the fuel tanks are empty no A. C. voltage is supplied to the impedance match 108. Thus the magnitude of the A. C. voltage supplied to the impedance match is directly proportional to the remaining fuel quantity in the fuel tanks 119. The sliding contact 110, being electrically connected to one point of the resistance part of the potentiometer part of the potentiometer 109, is regulated by the altimeter 111 in such a way that when the aircraft is on the ground the potentiometer 109 is short circuited and when the aircraft is at its maximum altitude the potentiometer is open. The resistance part of the potentiometer 109 is so calculated that the current passing through the resistor 112 always is inversely proportional to a predetermined fuel consumption of the aircraft, e. g. the most economic one, and when the sliding contact 110 is moved by the altimeter 111 along the resistance path of the potentiometer the current passing through the resistor 112 will vary inversely proportional to a predetermined fuel consumption depending on the height at which the aircraft flies. The current through the small resistance 112 is also dependent on the magnitude of the voltage supplied to the potentiometer 109 from the impedance match 108 and this voltage is as previously explained proportional to the remaining fuel quantity in the fuel tanks. It will thus be seen that the current passing through the resistance 112 will be directly proportional to the remaining fuel quantity and inversely proportional to a certain fuel consumption at a certain altitude of the aircraft, i. e. the remaining flying range at a certain speed. The voltage over the fixed small resistor 112 is directly proportional to the above mentioned current and this voltage is fed into the amplifier 113.

If the aircraft is influenced by wind, the velocity of which is comparatively large in relation to the actual speed of the aircraft, it will be necessary to make correction with regard to the wind in order to get a proper indication of the flying range. For this purpose there is connected to the amplifier 113 a manually settable potentiometer 120 by means of which the pilot can correct the output of the amplifier for existing wind velocity.

In the phase shifter 114 the amplified voltage is divided into two voltages 90° out of phase with respect to each other, and these two voltages are fed into the deflection means of the cathode ray tube through a manually settable wind direction corrector 121. Thus the cathode ray tube indicates on the screen the ring shaped picture 103 the radius of which is proportional to the remaining flying range of the aircraft at an actual altitude and at a predetermined fuel consumption corresponding to a predetermined speed at that altitude. If the pilot knows the direction of the wind he can by manual setting of the corrector 121 correct the shape of the ring and thus get an indication of the possible influence of the wind direction on the flying course of the aircraft.

In front of the cathode ray tube a fixed or movable map 122 can be placed by means of which the pilot can determine the region within which he can fly.

Figure 5:
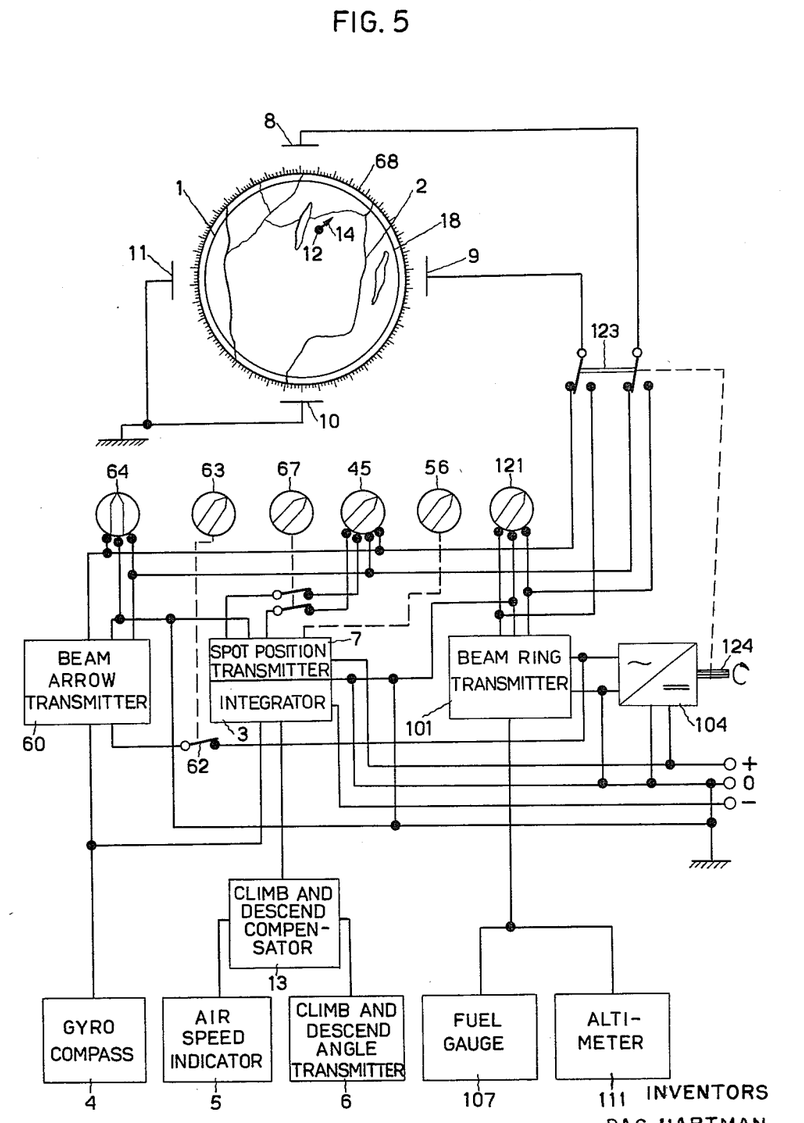
Fig. 5 is a diagrammatic view of the arrangements of Figs. 1 and 4 in a combined navigation system according to the invention.

Fig. 5 shows the arrangements of Figs. 1 and 4 in a combined navigation system, wherein the navigational data from the two arrangements described are presented in one presentation on the cathode ray tube. For this purpose the navigation system is provided with a shifting device 123 which is driven by the shaft 124 of the inverter 104 as shown with dashed lines to alternately connect the beam ring transmitter 101 and the spot position transmitter 7 to the deflection means 8, 9, 10, 11 in a rapid sequence, so that the spot image 12 and the beam ring 112 become visible simultaneously on the screen of the tube, whereby the pilot by looking at the screen can get an idea of his geographical position and by seeing if the position of the indicated spot is within or outside the picture of the ring can determine whether the remaining fuel quantity allows homing or not. The different parts of Fig. 5 refer to corresponding parts of Figs. 1 and 4 and are therefore symbolized and denoted with the same reference numbers.

It is obvious that the instrument designed according to the above mentioned description cannot be worked out to indicate the position of the aircraft exactly in relation to the map as the different transmitters (the air speed indicator 4, the gyro compass 5 etc.) as well as devices in the instrument itself (the integrator etc.) are subject to errors (speed errors, integration errors, course angle errors, errors on account of incorrect indication of the velocity and the direction of the wind etc.), but an accuracy calculated to approximately ±3% of distance flown and approximately ±5° of direction of flight might be maintained.

In order to obtain better navigational accuracy it is intended to provide means for checking and adjusting the instrument (the position of the beam spot) according to one or some of the methods, hereinafter described.

(1) If during flight a particular well-known groundbased target (a church steeple, a city, a lake, a rivermouth etc.) becomes visible to the pilot he can adjust the beam spot to a proper position on the map by means of the means for manual correction of the beam spot position previously described.

(2) If the aircraft is equipped with a radar set so designed that ground reflexes can be obtained even at high altitudes the radar system can be used to indicate the position of the aircraft by means of radar reflector beacons located on the ground, if the pilot knows the positions of these beacons and if the individual beacon by means of radio is able to disclose its identity to the pilot. By means of the information received on the radar screen of the actual location of the individual beacon the pilot can adjust the beam spot on the map in conformity with his true geographical position.

(3) If the aircraft is provided with e. g. two radio direction finders the instrument can be designed in such a way, that the beam spot automatically can be guided by the output from the radio navigation receivers in the aircraft as long as the aircraft is within the range of the beacons on the ground. When the aircraft is out of the range of the radio navigation system the instrument in itself may be able to deliver sufficiently accurate navigating data.

The invention is obviously not limited to the embodiment above described and shown in the accompanying drawings, but also other embodiments falling within the scope of the invention are possible. It will thus be seen that the navigation system above described may also be used in connection with a radar equipment on the ground combined with a television system, wherein the cathode ray tube is the airborne presenting part, which system combination produces on the cathode ray tube an indication of the position of the aircraft in relation to the radar equipment.

We claim:

1. In a navigation system for aircraft, means for measuring the speed of the aircraft, means for measuring the course of the aircraft, integrating means actuated by said speed and course measuring means for producing two outputs proportional respectively to the changes of the position coordinates of the aircraft, a cathode ray tube, means generating a spot image on the screen of the tube, and means connected to the deflection means of said tube and actuated by the outputs of said integrating means for energizing said deflection means to position the spot image on the screen of the tube in a position to indicate the position coordinates of the aircraft.

2. In a navigation system for aircraft, means for measuring the speed of the aircraft, means for measuring the course of the aircraft, integrating means actuated by said speed and course measuring means for producing two outputs proportional respectively to the changes of the position coordinates of the aircraft, a cathode ray tube, means generating a spot image on the screen of the tube, a transparent map secured in front of the screen of the tube, and means connected to the deflection means of the tube and actuated by the outputs of said integrating means for energizing said deflection means to position the spot image on the screen of the tube in a position to indicate the position coordinates of the aircraft on said map.

3. In a navigation system for aircraft, means for measuring the speed of the aircraft, means for measuring the course of the aircraft and means for measuring the climb and descend angle of the aircraft, integrating means actuated by said speed and course measuring means for producing two outputs proportional respectively to the changes of the position coordinates of the aircraft, compensating means actuated by said climb and descend angle measuring means for compensating the deviation of the speed measuring means with respect to the cosine of the climb or descend angle when the aircraft is climbing or descending, a cathode ray tube, means generating a spot image on the screen of the tube, and means connected to the deflection means of said tube and actuated by the outputs of said integrating means for energizing said deflection means to position the spot image on the screen of the tube in a position to indicate the position coordinates of the aircraft.

4. In a navigation system for aircraft, means for measuring the speed of the aircraft, means for measuring the course of the aircraft and means for measuring the climb and descend angle of the aircraft, integrating means for producing two outputs proportional respectively to the changes of the position coordinates of the aircraft, comprising two elements, power means driving said elements, devices connected to said elements and to said speed measuring means and to said course measuring means to drive said elements at speeds related to the speed of the aircraft as a function of the existing course, compensating means actuated by said climb and descend angle measuring means for compensating the deviation of the speed measuring means with respect to the cosine of the climb and descend angle when the aircraft is climbing or descending, a cathode ray tube, means generating a spot image on the screen of the tube, and means connected to said elements and to the deflection means of said tube to energize said deflection means to guide the deflection of the spot image in each of two directions perpendicular to each other to indicate the position coordinates of the aircraft.

5. In a navigation system for aircraft, means for measuring the speed of the aircraft, means for measuring the course of the aircraft, integrating means actuated by said speed and course measuring means for producing two outputs proportional respectively to the changes of the position coordinates of the aircraft, a cathode ray tube, means generating a spot image on the screen of the tube, means connected to the deflection means of said tube and actuated by the outputs of said integrating means for energizing said deflection means to position the spot image on the screen of the tube in a position to indicate the position coordinates of the aircraft, and adjustable means connected between said spot positioning means and the deflection means of said tube for compensating the position of the spot image with respect to wind velocity and direction.

6. In a navigation system for aircraft, means for measuring the speed of the aircraft, means for measuring the course of the aircraft, integrating means actuated by said speed and course measuring means for producing two outputs proportional respectively to the changes of the position coordinates of the aircraft, a cathode ray tube, means generating a spot image on the screen of the tube, a transparent map secured in front of the screen of the tube, and means connected to the deflection means of the tube and actuated by the outputs of said integrating means for energizing said deflection means to position the spot image on the screen of the tube to indicate the position coordinates of the aircraft on said map, and manually operable means for adjusting the position of the spot image on said map to correct the position to coincide with the exact geographical position of the aircraft.

7. In a navigation system for aircraft, means for measuring the speed of the aircraft, means for measuring the course of the aircraft, integrating means actuated by said speed and course measuring means for producing two outputs proportional respectively to the changes of the position coordinates of the aircraft, a cathode ray tube, means generating a spot image on the screen of the tube, means connected to the deflection means of said tube and actuated by the outputs of said integrating means for energizing said deflection means to position the spot image on the screen of the tube in a position to indicate the position coordinates of the aircraft, means connected to said spot positioning means and course measuring means to extend a line shaped arrow from the spot image in a direction corresponding to the course of the aircraft, and a manually operable switch device for disconnecting said arrow extending means as required in order to investigate which end of the arrow corresponds to the existing position of the aircraft.

8. In a navigation system for aircraft, means for measuring the speed of the aircraft, means for measuring the course of the aircraft, integrating means actuated by said speed and course measuring means for producing two outputs proportional respectively to the changes of the position coordinates of the aircraft, a cathode ray tube, means generating a spot image on the screen of the tube, a transparent map secured in front of the screen of the tube, and means connected to the deflection means of the tube and actuated by the outputs of said integrating means for energizing said deflection means to position the spot image on the screen of the tube in a position to indicate the position coordinates of the aircraft on said map, means connected to said spot positioning means and course measuring means to extend a line shaped arrow from the spot image in a direction on the map corresponding to the course of the aircraft, and means connected to said arrow extending means to further extend the line shaped arrow, so that the point of the arrow may be made to lie directly upon a certain destination point.

9. In a navigation system for aircraft, means for measuring the speed of the aircraft, means for measuring the course of the aircraft, integrating means actuated by said speed and course measuring means for producing two outputs proportional respectively to the changes of the position coordinates of the aircraft, a cathode ray tube, means generating a spot image on the screen of the tube, a transparent map secured in front of the screen of the tube, and means connected to the deflection means of the tube and actuated by the outputs of said integrating means for energizing said deflection means to position the spot image on the screen of the tube in a position to indicate the position coordinates of the aircraft on said map, a graduated scale mounted around the periphery of the map, means connected to said spot positioning means and course measuring means to extend a line shaped arrow from the spot image in a direction on the map corresponding to the course of the aircraft, and means connected to said arrow extending means for moving said line shaped arrow parallel to itself to locate the base of the arrow at the centre of the scale and for extending said line shaped arrow so as to make the point of the arrow lie on the scale.

10. In a navigation system for aircraft, means for measuring the remaining fuel quantity, means for measuring the altitude of the aircraft, calculating means actuated by said fuel and altitude measuring means for producing an output which is a function of the remaining flying range of the aircraft at a predetermined fuel consumption, a cathode ray tube including a screen and deflection means, and means operating in response to said output and connected to the deflection means of said tube for actuating the deflection means to produce on the screen of the tube a ring shaped display the radius of which is a function of said output and thereby of the remaining flying range.

11. In a navigation system for aircraft, means for measuring the remaining fuel quantity of the aircraft, means for measuring the altitude of the aircraft, calculating means actuated by said fuel and altitude measuring means and producing an output which is a function of the remaining flying range of the aircraft at a predetermined fuel consumption, a cathode ray tube including a screen and deflection means, a transparent map secured in front of the screen of the tube, and means operating in response to said output and connected to the deflection means of the tube for actuating the deflection means to produce on the screen of the tube a ring shaped display visible through the map, the radius of the ring shaped display being a function of said output and thereby of the remaining flying range.

12. In a navigation system for aircraft, means for measuring the remaining fuel quantity of the aircraft, means for measuring the altitude of the aircraft, calculating means actuated by said fuel and altitude measuring means and producing an output which is a function of the remaining flying range of the aircraft at a predetermined fuel consumption, a cathode ray tube including a screen and deflection means, means operating in response to said output and connected to the deflection means of said tube for actuating the deflection means to produce a ring shaped display on the screen of the tube, and adjustable means connected between said calculating means and said deflection means to correct the ring shaped display in accordance with existing wind velocity and direction.

13. In a navigation system for aircraft, means for measuring the speed of the aircraft, means for measuring the course of the aircraft, integrating means actuated by said speed and course measuring means for producing two outputs proportional respectively to the changes of the position coordinates of the aircraft, a cathode ray tube, means including a screen and deflection means, means connected to the deflection means of said tube and actuated by the outputs of said integrating means for energizing said deflection means to position a spot image generated on the screen of the tube in a position to indicate the position coordinates of the aircraft, means for measuring the remaining fuel quantity of the aircraft, means for measuring the altitude of the aircraft, calculating means actuated by said fuel and altitude measuring means and producing an output which is a function of the remaining flying range of the aircraft at a predetermined fuel consumption, means operating in response to said output and connected to the deflection means of said tube for actuating the deflection means to produce on the screen of the tube a ring shaped display the radius of which is a function of said output and thereby of the remaining flying range, and shifting means for alternately connecting said spot positioning means and said ring producing means to said deflection means sufficiently rapidly to make the spot image and the beam ring appear simultaneously to a spectator.

14. In a navigation system for aircraft, means for measuring the speed of the aircraft, means for measuring the course of the aircraft, integrating means actuated by said speed and course measuring means for producing two outputs proportional respectively to the changes of the position coordinates of the aircraft, a cathode ray tube, means including a screen and deflection means, a transparent map secured in front of the screen of the tube, means connected to the deflection means of the tube and actuated by the outputs of said integrating means for energizing said deflection means to position a spot image generated on the screen of the tube in a position to indicate the position coordinates of the aircraft on the map, means for measuring the remaining fuel quantity of the aircraft, means for measuring the altitude of the aircraft, calculating means actuated by said fuel and altitude measuring means and producing an output which is a function of the remaining flying range of the aircraft at a predetermined fuel consumption, means operating in response to said output and connected to the deflection means of said tube for actuating the deflection means to produce on the screen of the tube a ring shaped display visible through the map, the radius of the ring shaped picture being a function of said output and thereby of the remaining flying range, and shifting means for alternately connecting said spot positioning means and said ring producing means to said deflection means sufficiently rapidly to make the spot image and the beam ring appear simultaneously to a spectator.

15. In a navigation system for aircraft, means for measuring the speed of the aircraft, means for measuring the course of the aircraft and means for measuring the climb and descend angle of the aircraft, integrating means actuated by said speed measuring means and said course measuring means for producing two outputs proportional respectively to the changes of the position coordinates of the aircraft, compensating means actuated by said climb and descend angle measuring means for compensating the deviation of the speed measuring means with respect to the cosine of the climb or descend angle when the aircraft is climbing or descending, a cathode ray tube, means including a screen and deflection means, a transparent map secured in front of the screen of the tube, and means connected to the deflection means of the tube and actuated by the outputs of said integrating means for energizing said deflection means to position a spot image generated on the screen of the tube in a position to indicate the position coordinates of the aircraft on said map, adjustable means connected between said spot positioning means and said deflection means for compensating the position of the spot image with respect to wind velocity and direction, manually operable means for adjusting the position of the spot image on said map to correct the position of said spot to coincide with the exact geographical position of the aircraft, a graduated scale mounted around the periphery of the map, means connected to said spot positioning means and said course measuring means to extend a line shaped arrow from the spot image in a direction on the map corresponding to the course of the aircraft, and means connected to said arrow extending means for moving said line shaped arrow parallel to itself to locate the base of the arrow in the centre of the scale and for extending said line shaped arrow so as to make the point of the arrow lie on the scale, means for measuring the remaining fuel quantity of the aircraft, means for measuring the altitude of the aircraft, calculating means actuated by said fuel and altitude measuring means and producing an output which is a function of the remaining flying range of the aircraft at a predetermined fuel consumption, means operating in response to said output and connected to the deflection means of said tube for actuating the deflection means to produce a ring shaped display on the screen of the tube, adjustable means connected between said calculating means and said deflection means to correct the ring shaped display in accordance with existing wind velocity and direction and shifting means for alternately connecting said spot positioning means and said ring producing means to said deflection means sufficiently rapidly to make the spot image and the beam ring appear simultaneously to a spectator.

16. A navigation system for aircraft comprising a cathode ray tube in said craft having a screen and deflection means, a radar equipment on the ground combined with a television system, wherein said cathode ray tube is the airborne presenting part, said system combination producing on said cathode ray tube an indication of the portion of the aircraft in relation to said radar equipment, means for measuring the remaining fuel quantity of the aircraft, means for measuring the altitude of the aircraft, calculating means actuated by said fuel and altitude measuring means and producing an output which is a function of the remaining flying range of the aircraft at a predetermined fuel consumption, and means operating in response to said output and connected to the deflection means of said tube for actuating the deflection means to produce on the screen of the tube a ring shaped display, the radius of which is a function of said output and thereby of the remaining flying range.

References Cited in the file of this patent

UNITED STATES PATENTS

| | | |
|---|---|---|
| 2,262,033 | Moseley | Nov. 11, 1941 |
| 2,262,245 | Moseley et al. | Nov. 11, 1941 |
| 2,375,227 | Hillman | May 8, 1945 |
| 2,395,351 | Sohn | Feb. 19, 1946 |
| 2,406,836 | Holden | Sept. 3, 1946 |
| 2,421,783 | Glatz | June 10, 1947 |
| 2,462,077 | Duggar | Feb. 22, 1949 |
| 2,467,179 | Andresen | Apr. 12, 1949 |
| 2,506,353 | Finneran | May 2, 1950 |
| 2,507,567 | Garnier | May 16, 1950 |
| 2,538,843 | McGuire | Jan. 23, 1951 |
| 2,569,328 | Omberg | Sept. 25, 1951 |
| 2,608,094 | Best | Aug. 26, 1952 |